(12) United States Patent
Ellis et al.

(10) Patent No.: US 7,338,242 B2
(45) Date of Patent: Mar. 4, 2008

(54) QUICK-CONNECT FASTENER ASSEMBLY

(76) Inventors: Gary L. Ellis, 432 N. 560 W., American Fork, UT (US) 84003; Kay McGee, 431 W. 200 South, Lehi, UT (US) 84043

( * ) Notice: Subject to any disclaimer, the term of this patent is extended or adjusted under 35 U.S.C. 154(b) by 66 days.

(21) Appl. No.: 11/287,987

(22) Filed: Nov. 28, 2005

(65) Prior Publication Data

US 2007/0122248 A1    May 31, 2007

(51) Int. Cl.
*F16B 39/01*    (2006.01)
(52) U.S. Cl. .................. 411/260; 411/266; 411/270
(58) Field of Classification Search ........ 411/265–270, 411/260
See application file for complete search history.

(56) References Cited

U.S. PATENT DOCUMENTS

| | | | |
|---|---|---|---|
| 290,028 A * | 12/1883 | Fulwiler | 411/268 |
| 783,630 A * | 2/1905 | Gibbs | 411/237 |
| 1,037,739 A * | 9/1912 | Dreger | 411/266 |
| 3,030,996 A * | 4/1962 | Doerr | 411/270 |
| 3,332,463 A * | 7/1967 | Seckerson et al. | 411/265 |
| 3,635,530 A | 1/1972 | Packer et al. | |
| 3,797,336 A | 3/1974 | Howe | |
| 4,083,288 A | 4/1978 | Williams | |
| 4,236,561 A * | 12/1980 | Monticelli | 411/280 |
| 5,073,072 A | 12/1991 | Parekh et al. | |
| 5,100,275 A | 3/1992 | Schirrmacher | |
| 5,433,567 A | 7/1995 | Ito | |
| 2005/0135901 A1 * | 6/2005 | Reindl | 411/433 |

* cited by examiner

Primary Examiner—Jack W. Lavinder

(57) ABSTRACT

A fastener assembly includes a washer element and a nut element. The nut element is split and includes a screw thread that threadably engages the thread of a bolt or other such fastener element to lock the nut to the bolt. The nut element is adapted by the split to assume an open configuration which permits the nut to move freely along the bolt without being threadably engaged with the bolt and a closed configuration which threadably engages the screw thread of the nut with the screw thread of the bolt. The washer is sized to move freely over the screw thread of the bolt, but to force the nut into the closed configuration when the washer and the nut are cooperatively engaged. The washer maintains the nut in threaded engagement with the bolt when the washer and the nut are cooperatively engaged on the bolt.

4 Claims, 3 Drawing Sheets

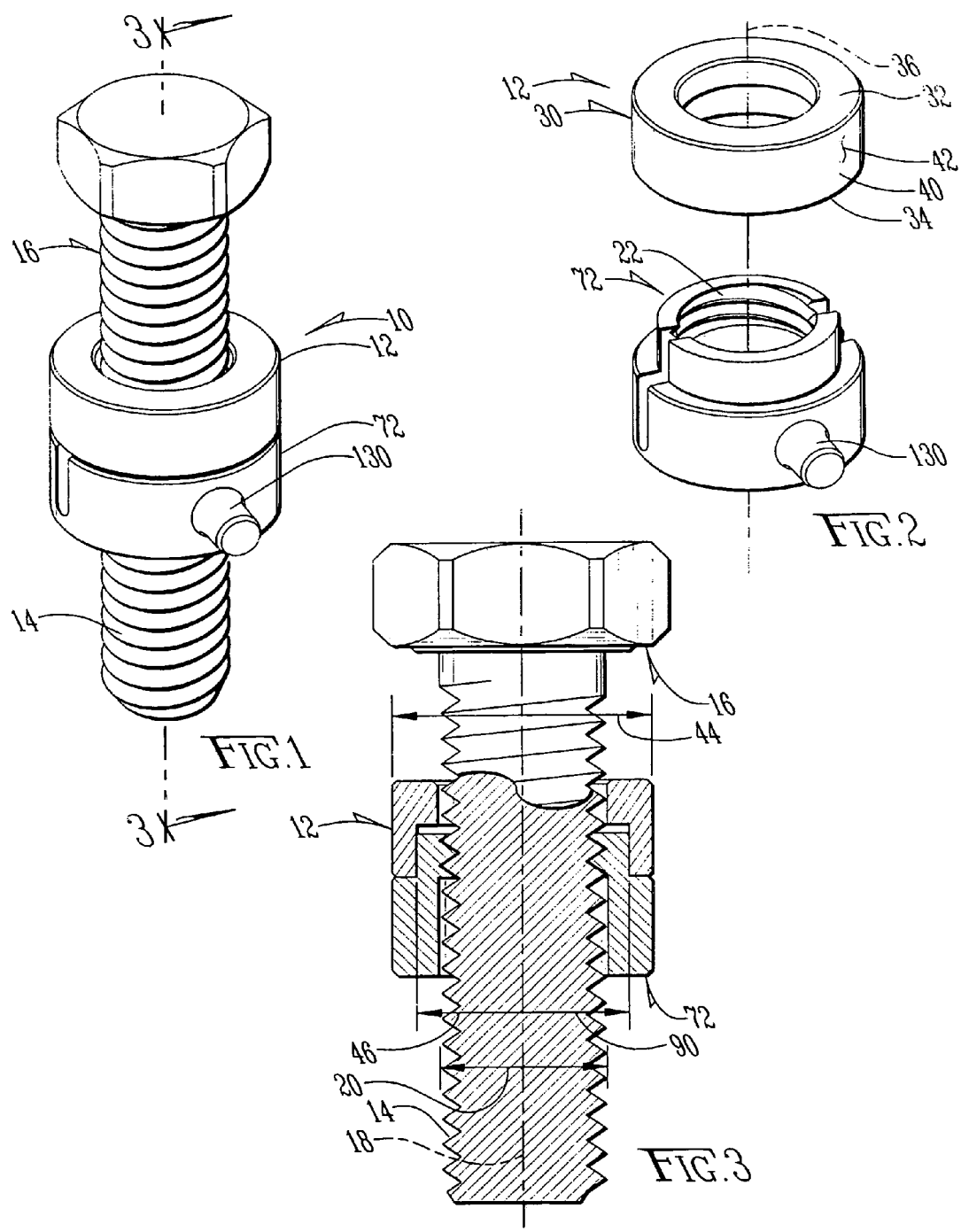

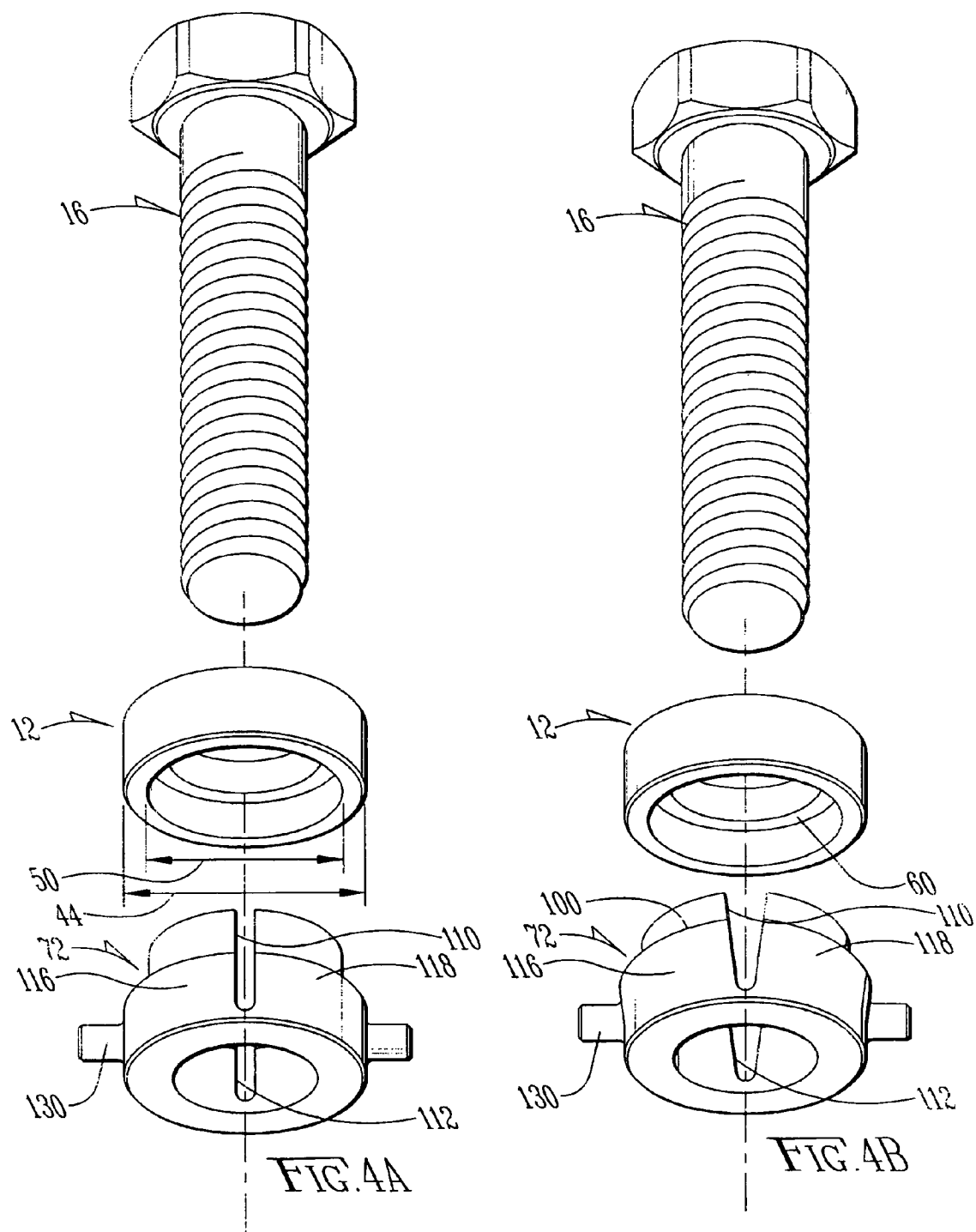

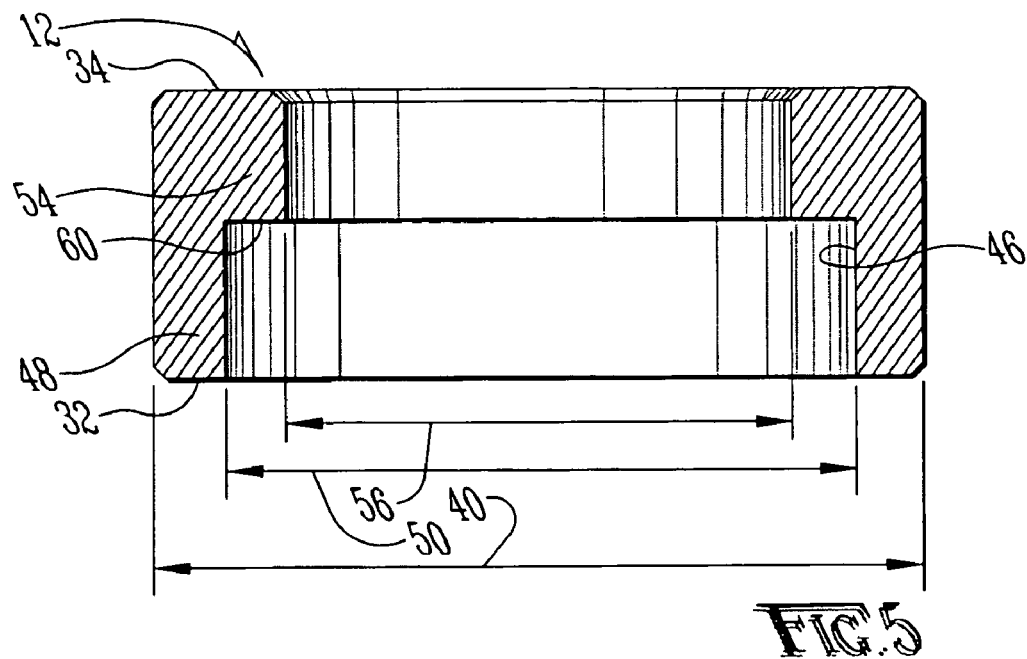
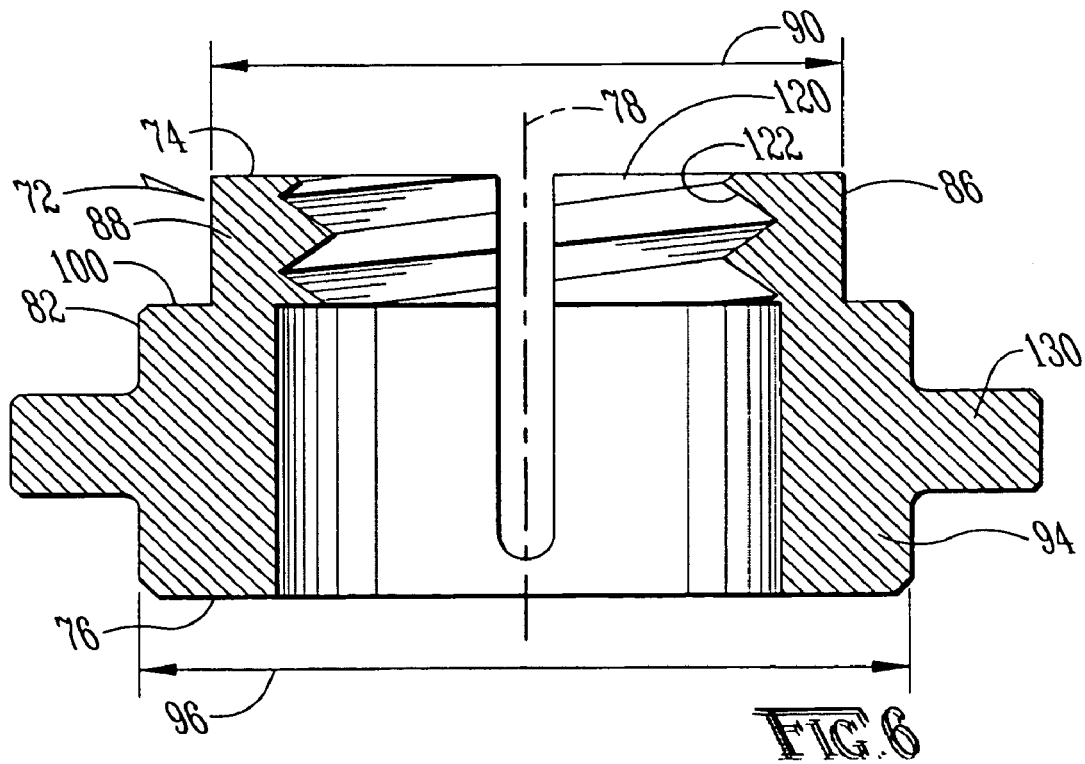

QUICK-CONNECT FASTENER ASSEMBLY

TECHNICAL FIELD OF THE INVENTION

The present invention relates to the general art of fasteners, and to the particular field of quick-connect fasteners.

BACKGROUND OF THE INVENTION

Conventional threaded fasteners may comprise a nut and a corresponding threaded portion on e.g a bolt or a threaded stud which can be used to fasten components. Often, the threaded stud is quite long. Since a nut must be coupled to the stud by threading, it can be a lengthy task to move a nut all the way up a long stud to the desired location. This process may be exacerbated if the coupling unit is located in a difficult-to-reach location.

Therefore, there is a need, especially in the construction industry, for couplers and nuts which can quickly and easily interconnect two members and then, perhaps later, tightly secure them together. Various types of quick-connect couplers have been proposed for a number of uses, but none have generally replaced or supplanted bolts and nuts, simply because bolts and nuts are cheap, and can provide strong and secure connections. Also, they can be tightened or loosened as desired. Thus, even though an attachment by a bolt and nut is slow when a premium is placed upon a workman's time, other types of connectors are usually not as satisfactory.

Quick locking fastening nuts have been available for various purposes in the past. The objective of a quick locking fastening nut is to be able to translationally slide the fastening nut on a bolt or threaded member without the necessity of rotation until the fastening nut is in substantial final engagement against an abutment surface of the head of the bolt. A wrench or other tool is used to tighten the fastening nut during its final rotational engagement. This is achieved in some presently-existing assemblies by a wedging action which causes a tightening of a segmented internally threaded insert set in the nut casing. The segments are spread apart by the threads of a bolt inserted through the threaded aperture defined by the segments, allowing the bolt to be pushed through by translational movement. However, the segments are sufficiently confined within the nut casing to allow the nut segments to grasp the threads when rotated into engagement.

While these prior art quick-locking fasteners generally work well, they often require a wedging action for the nut to remain in place. If the fastener assembly is subject to vibration or other shocking action, the wedging action may become loose over time which may tend to loosen the fastener. Still further, many of the prior art quick-locking fasteners are complicated and hence expensive. Still further, some of the prior art quick-connect fasteners require one portion of the fastener to abut against another structure, such as the workpiece or the like. This may not always be convenient.

Therefore, there is a need for a simple quick-locking fastener that is easily used even on long bolts where the fastener may not be able to abut another structure and yet will be secure once in place.

SUMMARY OF THE INVENTION

These, and other, objects are achieved by a fastener assembly which includes a washer element and a nut element. The nut element is split and includes a screw thread that threadably engages the thread of a bolt or other such fastener element to lock the nut to the bolt. The nut element is adapted by the split to assume an open configuration which permits the nut to move freely along the bolt without being threadably engaged with the bolt and a closed configuration which threadably engages the screw thread of the nut with the screw thread of the bolt. The washer is sized to move freely over the screw thread of the bolt, but to force the nut into the closed configuration when the washer and the nut are cooperatively engaged. The washer maintains the nut in threaded engagement with the bolt when the washer and the nut are cooperatively engaged on the bolt.

Using the embodying the present invention will permit a nut to be quickly located on a bolt, even a very long bolt, without threadably engaging that bolt and then to be quickly, yet securely, threadably engaged with that bolt once the nut reaches the desired location on the bolt. The washer will be easily and quickly positioned on the bolt, and will then securely maintain the nut in threaded engagement with the bolt when desired. Thus, a nut can be placed on a long bolt and secured thereto even if the bolt is very long and the nut is to be located in a difficult-to-reach location, and will remain secured to the bolt.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a perspective view of a quick-connect fastener assembly embodying the present invention in place on a bolt.

FIG. 2 is an exploded perspective view of the quick-connect fastener assembly embodying the present invention.

FIG. 3 is a sectional view taken along line 3-3 of FIG. 1.

FIG. 4A is a perspective view showing the assembly in position to be placed on a threaded fastener.

FIG. 4B is a perspective view showing the assembly in another position to be placed on a threaded fastener.

FIG. 5 is a side elevational view of a washer element included in the fastener assembly embodying the present invention.

FIG. 6 is a side elevational view of a nut element included in the fastener assembly embodying the present invention.

DETAILED DESCRIPTION OF THE INVENTION

Referring to the figures, it can be understood that the present invention is embodied in a quick-connect fastener assembly 10 which achieves the objectives of the present invention.

Assembly 10 comprises a washer element 12 that fits onto a threaded portion 14 of a long bolt 16 having a longitudinal axis 18 and an outer diameter 20 when in us. Washer element 12 includes an annular body 30 which has a first end 32, a second end 34 and a longitudinal axis 36 which extends between first end 32 and second end 34 and which is co-linear with longitudinal axis 18 of bolt 14 when the washer is in place on the bolt as shown in FIG. 2.

An outer cylindrical wall 40 of washer element 12 connects first and second ends 32 and 34. Wall 40 includes an outer surface 42 having an outer diameter 44 and an inner surface 46. Inner surface 46 of the wall is stepped and includes a first portion 48 which has a first diameter 50 and which extends from first end 32 of the body towards second end 34 of the body.

Stepped inner surface 46 further includes a second portion 54 which has a second diameter 56 and which extends from first portion 48 to second end 34 of the body. Second diameter 56 is smaller than first diameter 50 and larger than outer diameter 20 of threaded portion 16 of the bolt so the washer can move freely along the threaded portion of the bolt without engaging the threads of the threaded portion of the bolt. A ledge 60 is located at the junction of the first and second portions.

A nut element 70 includes an annular body 72 which has a first end 74 which abuts ledge 60 of the washer when the nut and the washer are cooperatively engaged as shown in FIG. 2. Nut element 70 further includes a second end 76 and a longitudinal axis 78 which extends between the first and second ends of the nut element and which is co-linear with longitudinal axis 20 of the threaded portion of the bolt when the nut element is in place on the bolt. As will be understood from this disclosure, nut element 70 is adapted to move between an open configuration shown in FIG. 4A and a closed configuration shown in FIG. 2.

Nut element 70 further includes a cylindrical wall 82 which connects the first and second ends of the nut element. Nut element 70 includes an outer surface 86, a first portion 88 that has an outer diameter 90. When nut 70 is in the closed configuration, outer diameter 90 of the first portion is equal to inner diameter 50 of first portion 48 of inner wall 46 of washer 12. When nut 70 is in the open configuration, outer diameter 90 of the first portion is larger than inner diameter 50 of first portion 48 of the washer. First portion 88 of the nut element extends from first end 74 of the nut element towards second end 76 of the nut element.

Nut element 70 further includes a second portion 94 that has an outer diameter 96 that is larger than outer diameter 90 of first portion 88 of the nut element and which is essentially equal to outer diameter 44 of the washer when the nut element is in the closed configuration. In the closed configuration of nut element 70 and the assembled condition of the fastener assembly shown in FIG. 2, the outer surface of first portion 88 of the nut element snugly abuts the inner surface of the first portion 48 of the washer when the nut and the washer are cooperatively engaged as shown in FIG. 2.

A ledge 100 is located at the intersection of the first and second portions of the cylindrical wall of the nut to abut first end 32 of the washer when the nut and washer are cooperatively engaged.

First and second splits 110 and 112 are defined in the nut. The splits are diametrically opposed to each other and extend from first end 74 of the nut toward second end 76 of the nut past ledge 100 and define a first section 116 of the nut and a second section 118 of the nut. As can be understood from the teaching of FIGS. 2, 4A and 4B, sections 116 and 118 are separated from each other by the splits when the nut element is in the open configuration and are squeezed into abutting contact with each other when the nut element is in the closed configuration. When the nut element is forced into the washer element when both elements are on the threaded portion of the bolt, nut element is squeezed into the closed configuration by the washer element and the threaded portion of the bolt.

Cylindrical wall 82 further includes an inner surface 120 which includes a screw thread 122 that is sized and shaped to threadably engage threads 20 of threaded portion 16 of the bolt when the nut is cooperatively engaged on the bolt and with the washer as shown in FIG. 2.

Operation of assembly 10 can be understood from the teaching of this disclosure and thus will not be described in detail. Assembly 10 is located near a long bolt with the washer element and the nut element oriented with respect to each other and with respect to the bolt as shown in FIG. 4A. The washer element is slid onto the bolt into the desired location on the bolt, and the nut element is maintained in the open configuration and is then slid over the threads and onto the bolt to be located near the washer element. The nut is in then squeezed into the closed configuration and threaded into engagement with the washer element as shown in FIG. 2. The splits in the nut element permit that element to be easily and quickly placed on the bolt, but, once closed, will permit the nut element to establish, and maintain, a secure engagement with the washer element and with the bolt. A tool, such as a wrench or the like, can be used for the threading step. Nut element 72 can include projections, such as projection 130, on the outer surface thereof to assist the engagement of the tool with the nut. The closing action of the washer element on the nut element causes the screw thread of the nut element to threadably engage the screw thread of the bolt and to securely fasten the nut element to the bolt in the selected location on the bolt without requiring the nut to be threadably moved from the distal end of the bolt all the way to the selected location on the bolt.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A quick-connect fastener assembly comprising:
   A) a washer element that fits onto a threaded portion of a long bolt having a longitudinal axis and an outer diameter when in use, the washer element including a body which has
      (1) a first portion having a first dimension,
      (2) a second portion having a second dimension, the second dimension being smaller than the first dimension and being larger than the outer diameter of the threaded portion of the bolt so the washer can move freely along the threaded portion of the bolt without engaging the threads of the threaded portion of the bolt; and
   B) a nut element which includes a body having
      (1) a first portion having a first outer dimension,
      (2) a second portion having a second outer dimension, and
      (3) first and second splits defined in the nut element, the splits extending through the first portion of the nut element and into the second portion of the nut element and defining a first section of the nut element and a second section of the nut element,
      (4) the nut being adapted by the splits to assume an open configuration with the first and second sections of the nut element being spaced apart from each other and a closed configuration with the first and second sections of the nut element being in contact with each other, (5) the outer dimension of the first portion of the nut element slightly smaller than the first dimension of the first portion of the washer element when the nut element is in the closed configuration, (6) the cylindrical wall of the nut element having an inner surface and an outer surface, the inner surface includes a screw thread that is sized and shaped to threadably engage the threaded portion of the bolt when the nut element is in the closed configuration and cooperatively engaged on the bolt and with the washer, and the outer surface includes at least one projection to assist in engagement of the nut element with a tool, and (7) the first section of the nut element being forced into abutting engagement with the second section of the nut element when the nut element is in the closed configuration and cooperatively engaged with the washer and with the threaded portion of the bolt.

2. A quick-connect fastener assembly comprising:

a bolt having a threaded portion defining a longitudinal axis;

a nut having a first portion and a second portion, the nut having a partial cut to allow the nut to be in a closed configuration and an opened configuration, where in the opened configuration, the nut is able to slide along the longitudinal axis of the thread portion of the bolt, the nut having an outer surface which includes at least one projection to assist in engagement of the nut element with a tool; and a washer having opening adapted to slide along the longitudinal axis of the threaded portion of the bolt and receive the first portion of the nut when the nut is in the closed configuration such tat inner threads of the nut engage with the threaded portion of the bolt.

3. The fastener assembly according to claim 2, where the partial cut on the nut runs through the first portion and a portion of the second portion.

4. A quick-connect fastener assembly consisting of:

a bolt having a threaded portion defining a longitudinal axis;

a nut having a first portion and a second portion, the nut having a partial cut to allow the nut to be in a closed configuration and an opened configuration, where in the opened configuration, the nut is able to slide along the longitudinal axis of the thread portion of the bolt, the nut having an outer surface which includes at least one projection to assist in engagement of the nut element with a tool; and a washer having opening adapted to slide along the longitudinal axis of the threaded portion of the bolt and receive the first portion of the nut when the nut is in the closed configuration such that inner threads of the nut engage with the threaded portion of the bolt.

* * * * *